N. WARLICK.
Shovel Plow.
No. 12,650.
Patented Apr. 3, 1855.
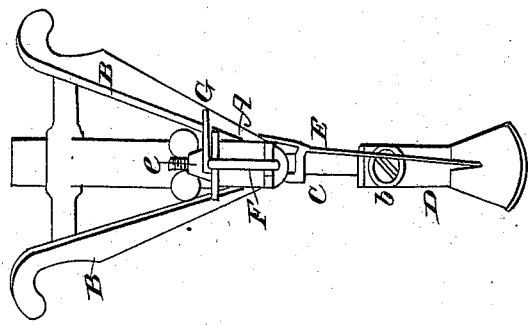
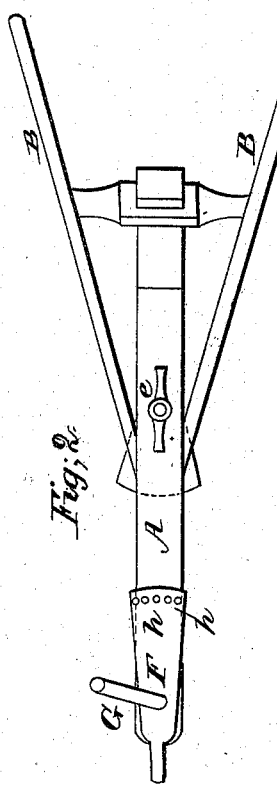
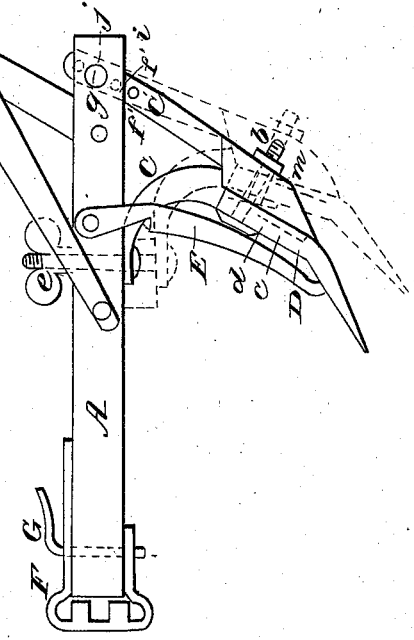

UNITED STATES PATENT OFFICE.

NOAH WARLICK, OF LA FAYETTE, ALABAMA.

IMPROVEMENT IN PLOWS.

Specification forming part of Letters Patent No. 12,650, dated April 3, 1855.

*To all whom it may concern:*

Be it known that I, NOAH WARLICK, of La Fayette, in the county of Chambers and State of Alabama, have invented a new and useful Improvement in Plows for Plowing up Rough and Stony and Stubby Land; and I do hereby declare that the following is a full, clear, and exact description of the same, reference being had to the accompanying drawings, forming part of this specification, in which—

Figure 1 is a side elevation of a plow constructed after my invention. Fig. 2 is a plan of the same, and Fig. 3 a front view.

Wherever the same letters are used in the several figures they indicate corresponding parts.

My invention relates particularly to plows employed for plowing up stony and stubby soil, and is designed to give them increased strength and durability without adding to their weight, and also render them capable of being used with safety and to advantage, in cases of necessity, as levers or crow-bars for prying up or raising stones and stubs out of the soil, and likewise of being set with ease and facility to cut to any depth desired.

To enable others skilled in the art to make and use my invention, I will proceed to describe its construction and operation.

A represents the beam, and B B the handles, of the plow. C C' is a Y-shaped brace; D, foot-piece or plow; E, the colter; F, the clevis, and G its fulcrum.

The foot-piece or plow D is made with its point sharp and flat, and of shape as shown in the drawings, so as to be capable of performing the plowing operation more perfectly. The upper portion of said foot-piece or plow is made quite narrow, so as to correspond with the brace C C', and rests and is secured firmly upon the seat provided on the lower portion of the brace by a set-screw and tongue and groove, the hole for the set-screw $b$ being cut through the plow and seat, and the groove $c$ being cut in the under side of the plow, while the tongue $d$ is cast on top the lower portion of the brace C C'.

The point D is provided with a notch, $m$, to receive the lower end of the colter and confine it.

The brace C C' is made of Y shape, so that the point $m$ may bear on the ground when desirable, and more especially to give double support and increased strength, and also render the plow as a whole capable of being used as a crow-bar or lever with safety. The back arm or prong, C', of the brace, owing to its extending to the rear end of the beam, receives a greater portion of the weight, and thus prevents the front one, C, from being broken when the plow is used as a crow-bar for forcing up stubs and stones. The brace C C' is attached to the beam by its upper ends, one of said ends being attached by a set-screw, $e$, a short distance from the center of the beam, and the other end being provided with a series of adjusting-holes, $f f'$, and inserted through a slot, $i$, cut in the beam near its rear extremity and secured by a set-pin, $g$. It is by thus securing the prongs of the brace to the beam that the plow can be adjusted to cut at an angle more or less oblique to a horizontal plane, for by simply turning the set-screw $e$ to the left and then inserting a block between the beam and front prong, as shown by red lines, the plow is caused to cut at an angle more oblique to a horizontal plane, and by removing the pin $g$ and bringing the hole $j$ opposite the hole $f'$ the plow is made to cut at an angle less oblique to a horizontal plane.

Instead of providing a slot in the hind end of the beam to receive the back brace, the said brace may be forked, and one of its forks secured to one side and its other fork to the opposite side of the beam.

I do not claim the whale-lance-shaped point separately; but

What I do claim as my invention, and desire to secure by Letters Patent, is—

The whale-lance-shaped point D, having a notch in its upper side to receive the lower end of the colter, in combination with said colter and the Y-shaped adjustable double brace C C', as set forth.

NOAH WARLICK.

Witnesses:
A. C. A. SIMMONS,
JOHN W. MILES.